(12) United States Patent
Keen

(10) Patent No.: US 6,401,851 B1
(45) Date of Patent: Jun. 11, 2002

(54) HOOD ASSEMBLY

(75) Inventor: Eric Albert Keen, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/661,856

(22) Filed: Sep. 14, 2000

(51) Int. Cl.⁷ .............................................. B62D 25/10
(52) U.S. Cl. ................... 180/89.17; 180/69.21
(58) Field of Search .................. 180/69.2, 69.21, 180/69.22, 69.23, 69.24, 69.25, 89.17, 89.18; 296/198; D15/15, 23

(56) References Cited

U.S. PATENT DOCUMENTS

| | | | | |
|---|---|---|---|---|
| 3,884,322 A | * | 5/1975 | Nemschoff .................. | 181/204 |
| 3,982,600 A | * | 9/1976 | Gerresheim et al. ..... | 180/69.21 |
| 4,270,623 A | * | 6/1981 | Brandl et al. .............. | 180/69.2 |
| 4,437,529 A | * | 3/1984 | Fralish ....................... | 180/69.2 |
| 4,458,774 A | * | 7/1984 | Sieren ....................... | 180/69.2 |
| 5,152,364 A | | 10/1992 | Woods et al. ............... | 180/292 |
| 5,193,636 A | * | 3/1993 | Holm ......................... | 180/68.1 |
| 5,535,846 A | | 7/1996 | Kurtz, Jr. et al. ........ | 180/69.21 |
| 5,634,525 A | | 6/1997 | Templeton et al. ...... | 180/69.24 |
| 5,678,648 A | * | 10/1997 | Imanishi et al. ........... | 180/68.1 |
| 5,803,198 A | * | 9/1998 | Baxter et al. ............. | 180/69.21 |
| 6,082,477 A | * | 7/2000 | Murakawa ................ | 180/69.21 |
| 6,092,818 A | | 7/2000 | Shute ....................... | 280/69.21 |

* cited by examiner

*Primary Examiner*—Brian L. Johnson
*Assistant Examiner*—Bryan R Fischmann

(57) ABSTRACT

A vehicle hood assembly includes a hood support having a top section joined to left and right side sections and to a front section. An outer panel assembly includes a finished top panel mounted on the top section, a finished front panel assembly mounted on the front section, a finished left side panel mounted on the left section, and a finished right side panel mounted on the right section. Each panel and its respective section form and enclose an air space therebetween. Thus, the inner support and the air space is interposed between the finished panels and the heat from the engine. As the hood is raised, the lower portions of the side panels engage a wear strip and are deflected laterally outwardly and away from each other. As the hood is lowered, the lower portions of the side panels move past the wear strip, and they move laterally inwardly and towards each other.

6 Claims, 4 Drawing Sheets

HOOD ASSEMBLY

BACKGROUND OF THE INVENTION

This invention relates to a hood assembly which covers an engine and other components of a vehicle, such as an agricultural or industrial vehicle.

It is a known practice to provide a tractor with a hood which encloses the engine and other components of the tractor. But conventional hoods may have problems as a result of thermal expansion of various parts of the hood. Conventional hoods also can interfere with visibility forward from a cab of the tractor. Conventional hoods typically have cosmetically finished panels which are relatively inflexible and are therefore subject to permanent damage when struck by an object, and which are directly exposed to heat from the vehicle engine.

SUMMARY OF THE INVENTION

An object of the present invention is to provide a vehicle hood assembly which accommodates thermal expansion of its components.

Another object is to provide such a hood assembly wherein interference with visibility forward from a cab of the tractor is minimized.

Another object is to provide such a hood assembly wherein cosmetically finished panels are relatively flexible so as to be less likely to be permanently damaged when struck by an object.

Another object is to provide such a hood assembly wherein finished panels are not directly exposed to heat from the vehicle engine.

These and other objects are achieved by this invention wherein a vehicle hood assembly includes a hood support having a top section joined to left and right side sections and to a front section. An outer panel assembly includes a finished top panel mounted on the top section, a finished front panel assembly mounted on the front section, a finished left panel mounted on the left section, and a finished right panel mounted on the right section. Each panel and its respective section form and enclose an air space therebetween. Thus, the inner support and the air space is interposed between the finished panels and the heat from the engine.

DESCRIPTION OF THE PREFERRED EMBODIMENT

Figure 1:
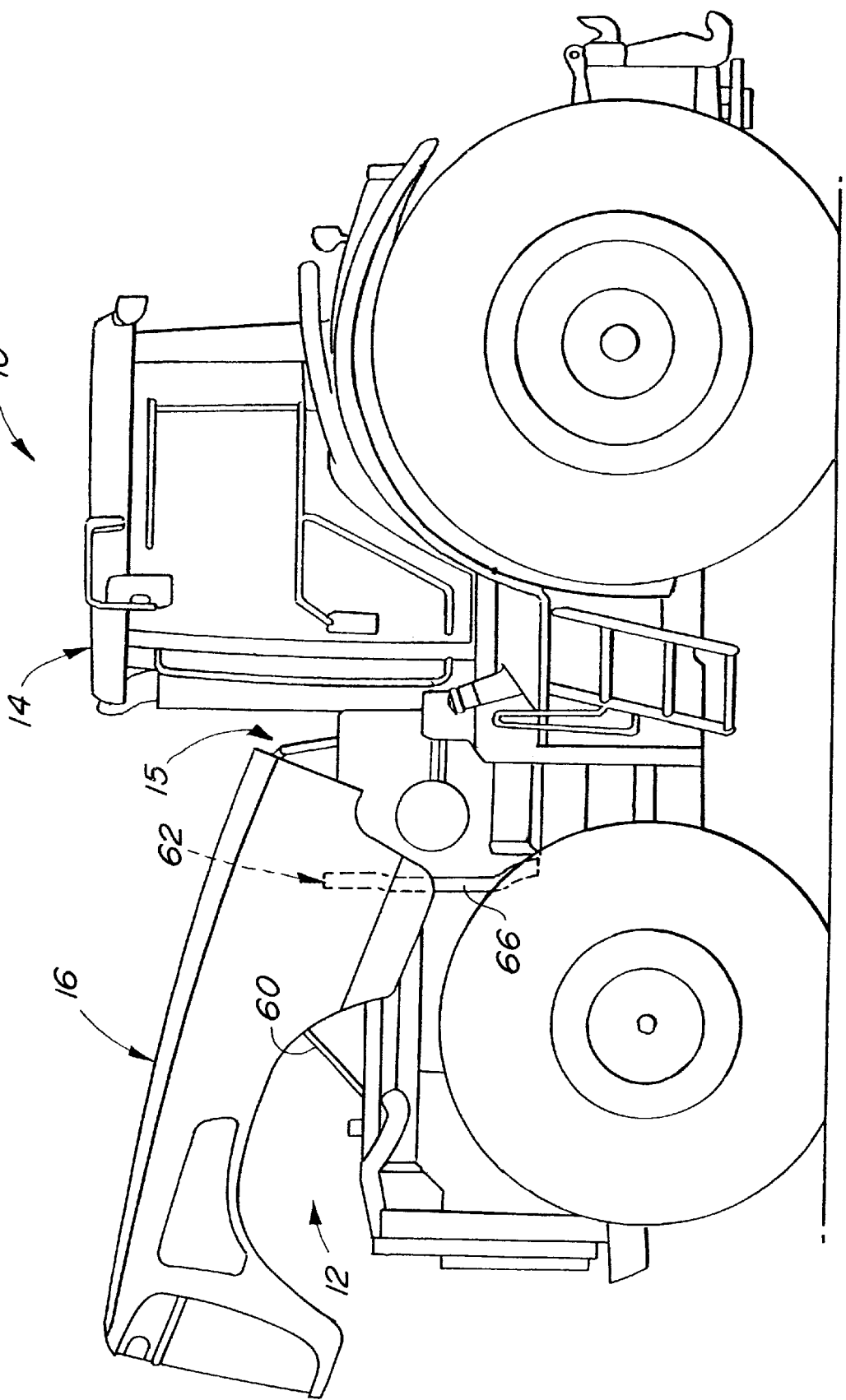
FIG. 1 is a side view of an agricultural tractor with a hood assembly according to the invention.
Figure 2:
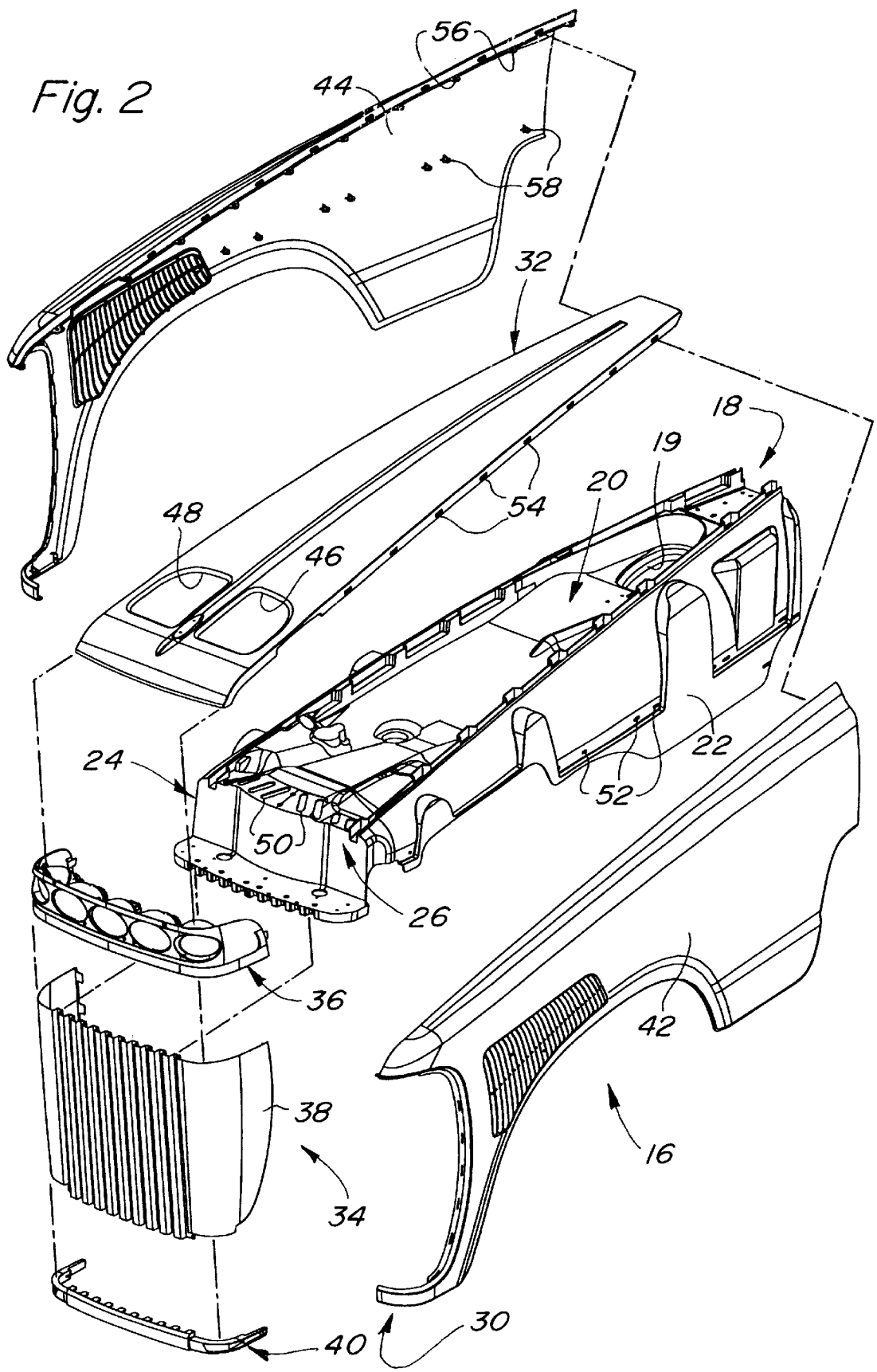
FIG. 2 is an exploded perspective view of the hood assembly of the present invention.
Figure 3:
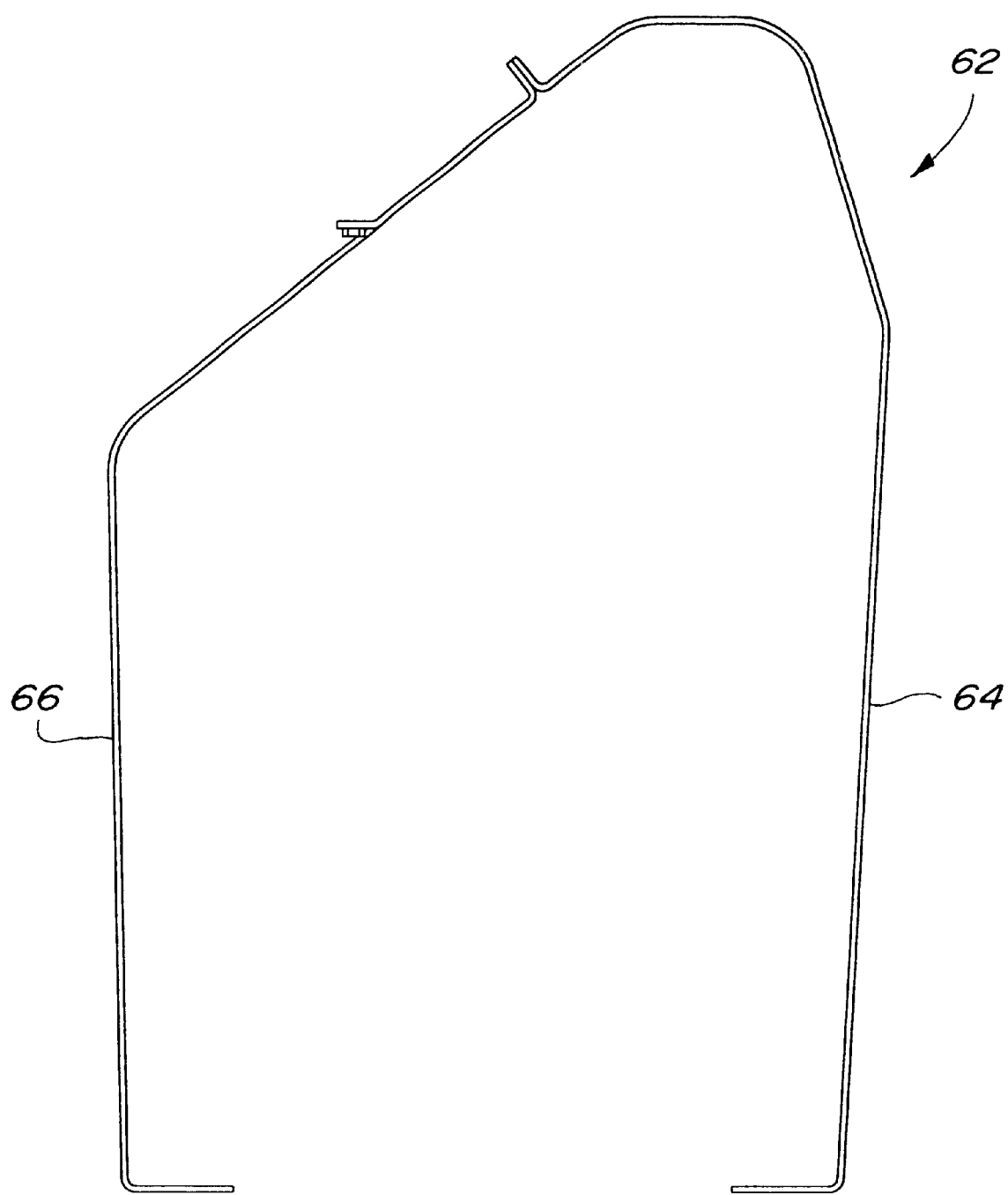
FIG. 3 illustrates a wear strip part of the hood assembly of FIG. 1.
Figures 4A, 4B:
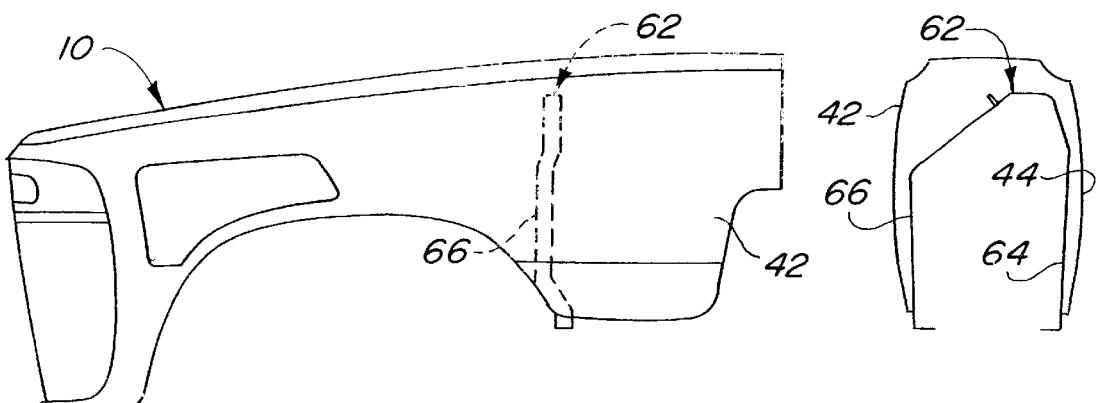
FIGS. 4a and 4b illustrate the relationship between the hood and the wear strip in a hood lowered position.
Figures 5A, 5B:
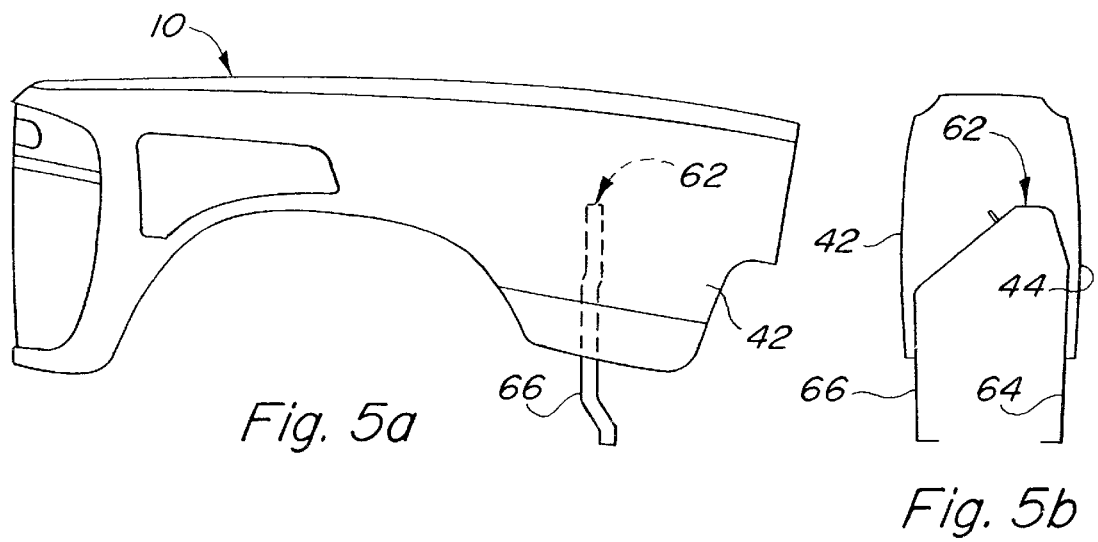
FIGS. 5a and 5b illustrate the relationship between the hood and the wear strip in a hood partially raised position.
Figures 6A, 6B:
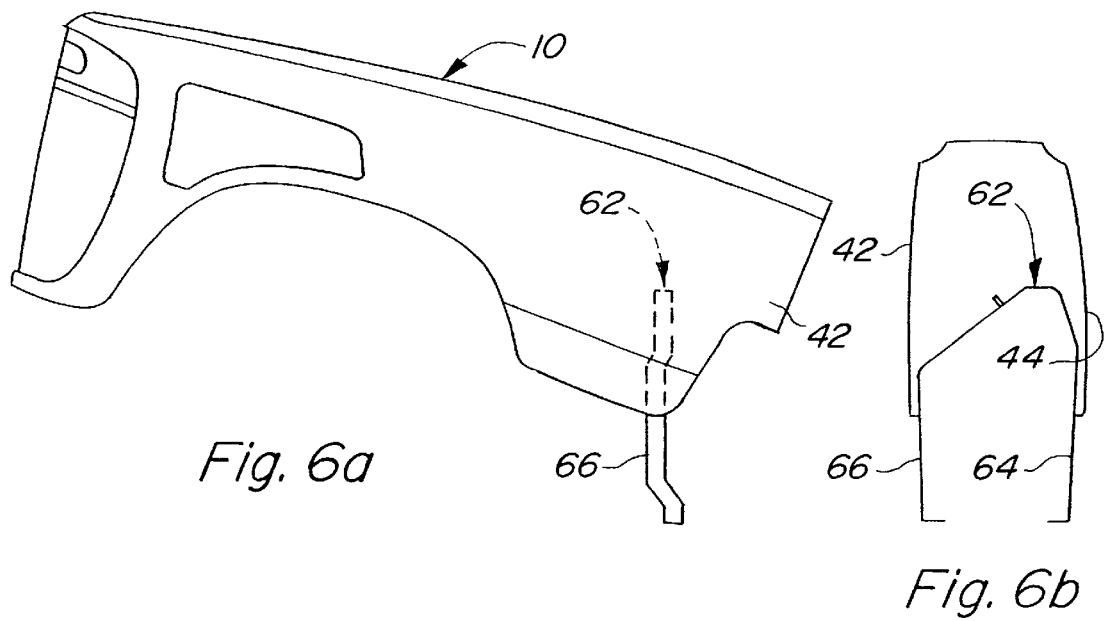
FIGS. 6a and 6b illustrate the relationship between the hood and the wear strip in another hood partially raised position.

As seen in FIGS. 1 and 2, an agricultural tractor 10 has an engine 12 which is located forward of the operators cab 14 and a hood assembly 16 which is coupled to the tractor by a hinge 15. As best seen in FIG. 2, the hood assembly 16 includes an inner hood support 18 having a top section 20 joined to left and right side sections 22, 24, and joined to a front section 26. The hood support 18 is preferably formed out of plastic material with a higher fiberglass content for higher rigidity. Top section 20 includes an intake opening 19 positioned to align with an intake air filter (not shown) of the engine 12.

Hood assembly 16 also includes a finished outer panel assembly 30 comprising a finished top panel 32 mounted on the top section 20, a finished front panel assembly 34, including a headlight assembly 36, grille 38 and trim piece 40, mounted on the front section 26, a finished left panel 42 mounted on the left section 22, and a finished right panel 44 mounted on the right section 24. When assembled, each panel 32, 42, 44 and its corresponding section 20, 22, 24, forms and encloses an air space therebetween. Top panel 32 includes a pair of engine air intake ports 46 and 48 formed therein. A plurality of engine air intake slots 50 are formed in a forward end of top section 20. Normally, engine intake air will flow from ports 46, 48 to opening 19 via the air space or duct formed between panel 32 and section 20. But, if the ports 46 and 48 are blocked, the engine 12 can still obtain intake air via slots 50. The panels 32, 42 and 44 are preferably formed out of plastic material with a lower or zero fiberglass content for lower weight and lower rigidity than the hood support 18.

A plurality of mounting slots 52 are formed in the side sections 22, 24 (although only left side section 22 is visible in FIG. 2). The slots 52 are preferably formed along a lower edge of side sections 22, 24. A plurality of mounting slots 54 are formed in the side edges of top panel 32 (although only left side of panel 32 is visible in FIG. 2). Each side panel 42, 44 has an upper array of inwardly projecting mounting pegs 56 (although only the pegs of right side of panel 44 are visible in FIG. 2). When assembled, the mounting pegs 56 are received in the corresponding slots 54.

Each side panel 42, 44 also has a lower array of inwardly projecting mounting pegs 58, (although only the pegs of right side of panel 44 are visible in FIG. 2). When assembled, the mounting pegs 58 are received in the corresponding slots 52 in the side sections 22 and 24. As one moves toward the rear of hood support 18, the slots 52 have a progressively longer fore-and-aft dimension to accommodate expansion and contraction of the panels 42, 44 relative to the side sections 22, 24 of the hood support 18. As a result, the side panels 42,44 are fixed with respect to the top panel 32, and panels 42, 44 and 32 form a unit which is movable with respect to the inner support 18.

The hood 16 may be held in a raised position by a support rod 60, part of which is visible in FIG. 1. A wear strip 62 is mounted over a rear portion of the engine 12. As best seen in FIGS. 3, 4, 5 and 6, the wear strip 62 has a generally inverted U-shape with downward extending legs 64 and 66. Preferably, the lower ends of the legs 64 and 66 are firmly attached to a part of the vehicle, such as a transmission housing. The upper ends of the legs 64 and 66 are farther apart from each other than are the lower ends of legs 64 and 66. As the hood 10 is raised, the lower portions of the side panels 42, 44 engage the wear strip 62 and are deflected laterally outwardly and away from each other. Conversely, as the hood 10 is lowered, as the lower portions of the side panels 42, 44 move past the wear strip 62, they move laterally inwardly and towards each other. This inward movement increases the visibility past the hood 10 when the hood is lowered. The inner hood support member 18 performs a heat shielding function between the panels 32, 42, 44 and the engine of the vehicle.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A vehicle hood assembly, comprising:

a wear strip mounted on the vehicle;

an inner hood support member pivotally mounted on the vehicle; and an outer panel assembly mounted to the inner support member and comprising left and right side panels, and each side panel having a lower part which slidably engages the wear strip, engagement of the lower part with the wear strip causing the lower part to flex outwardly as the inner hood support member and the outer panel assembly are pivoted upwardly, said lower parts flexing inwardly and towards each other as the inner hood support member and the outer panel assembly are pivoted downwardly.

2. A vehicle hood assembly of claim 1, wherein:

the wear strip comprises a generally inverted U-shaped member having a pair of legs.

3. A vehicle hood assembly of claim 2, wherein:

the legs are attached to a part of the vehicle.

4. A vehicle hood assembly, comprising:

an inner hood support member pivotally mounted on the vehicle; and an outer panel assembly mounted on the inner hood support member, the outer panel assembly comprising left and right side panels fixed to a top panel, the outer panel assembly forming a unit which is movable with respect to the inner support member in response to expansion and contraction of the panels, each side panel having a plurality of mounting pegs projecting inwardly therefrom, and the inner hood support member comprising a top section integrally joined to left and right side sections, each section having a plurality of mounting slots formed therein for releasably receiving the mounting pegs of a corresponding side panel, the mounting slots varying in size to accommodate expansion and contraction of the side panels relative to its corresponding section.

5. A vehicle hood assembly, comprising:

an inner hood support member pivotally mounted on the vehicle, the inner hood support member comprising a top section integrally joined to left and right side sections; and an outer panel assembly mounted on the inner hood support member, the outer panel assembly comprising left and right side panels fixed to a top panel, the outer panel assembly forming a unit which is movable with respect to the inner support member in response to expansion and contraction of the panels, each panel and its corresponding section forming an air space therebetween.

6. A vehicle hood assembly, comprising:

an inner hood support member pivotally mounted on the vehicle; and an outer panel assembly mounted on the inner hood support member, the outer panel assembly comprising left and right side panels fixed to a top panel, the outer panel assembly forming a unit which is movable with respect to the inner support member in response to expansion and contraction of the panels, the inner hood support member performing a heat shield function between the panels and an engine of the vehicle.

* * * * *